United States Patent
Janik (10) Patent No.: US 11,247,516 B2
(45) Date of Patent: Feb. 15, 2022

(54) AUTOMATIC TIRE PRESSURIZING SYSTEM AND METHOD

(71) Applicant: ELECTRONIC POWER DESIGN, Houston, TX (US)

(72) Inventor: John Bradford Janik, Houston, TX (US)

(73) Assignee: Electronic Power Design, Inc., Houston, TX (US)

( * ) Notice: Subject to any disclaimer, the term of this patent is extended or adjusted under 35 U.S.C. 154(b) by 1048 days.

(21) Appl. No.: 15/888,221

(22) Filed: Feb. 5, 2018

(65) Prior Publication Data

US 2018/0222259 A1    Aug. 9, 2018

Related U.S. Application Data (60) Provisional application No. 62/454,833, filed on Feb. 5, 2017.

(51) Int. Cl.
*B60C 23/04* (2006.01)
*B60C 23/00* (2006.01)
*B60K 15/03* (2006.01)

(52) U.S. Cl.
CPC ........ *B60C 23/0486* (2013.01); *B60C 23/004* (2013.01); *B60K 15/03* (2013.01); *B60K 2015/03217* (2013.01); *B60Y 2200/114* (2013.01); *B60Y 2400/302* (2013.01)

(58) Field of Classification Search
CPC .... B60C 23/003; B60C 23/004; B60C 23/001
See application file for complete search history.

(56) References Cited

U.S. PATENT DOCUMENTS

| | | | | |
|---|---|---|---|---|
| 6,278,363 | B1* | 8/2001 | Bezek | B60C 23/0416 340/442 |
| 9,278,588 | B2* | 3/2016 | Martin | B60C 23/002 |
| 2005/0251316 | A1* | 11/2005 | Kato | B60T 8/1755 701/70 |
| 2015/0375577 | A1* | 12/2015 | Serbu | B60C 23/0408 152/419 |
| 2016/0121666 | A1* | 5/2016 | Chan | B60C 23/20 137/78.1 |
| 2017/0359957 | A1* | 12/2017 | Noonan | B60C 23/003 |

FOREIGN PATENT DOCUMENTS

JP    4466919 B2 *   5/2010

* cited by examiner

*Primary Examiner* — Donald J Wallace
(74) *Attorney, Agent, or Firm* — G. Michael Roebuck, PC (57) ABSTRACT

A system is disclosed included but not limited to a wheel having a wheel pressure chamber; a tire having a tire pressure chamber, wherein the tire is mounted on the wheel; a tire pressure sensor inside of the tire pressure chamber for measuring a tire air pressure inside of the tire pressure chamber; a wheel outlet valve between the wheel pressure chamber and the tire pressure chamber; a processor that reads a measure of the pressure inside of the tire pressure chamber from the tire pressure sensor and controls the wheel outlet valve to allow gas from the wheel pressure chamber to flow into the tire pressure chamber to increase the pressure in the tire pressure chamber when the tire pressure is less than a reference tire pressure. A method is provided for using the system.

20 Claims, 6 Drawing Sheets

AUTOMATIC TIRE PRESSURIZING SYSTEM AND METHOD

CROSS REFERENCE TO RELATED APPLICATIONS

This patent application claims priority from U.S. Provisional Patent Application Ser. No. 62/454,833 filed on Feb. 5, 2017 entitled An Automatic Tire Pressurizing System and Method by John Janik, which is incorporated herein by reference in its entirety.

BACKGROUND OF THE INVENTION

Tires that are overinflated or underinflated wear out prematurely and are less safe than tires that are properly inflated. There is a need for automatically adjusting tire pressure to a proper reference pressure to increase durability and safety of a tire.

Field of the Invention

The invention relates to a system and method for automatically adjusting tire pressure to increase durability and safety of a tire.

SUMMARY OF THE INVENTION

A particular illustrative embodiment of a system is disclosed including but not limited to a wheel having a wheel pressure chamber; a tire having a tire pressure chamber, wherein the tire is mounted on the wheel; a tire pressure sensor inside of the tire pressure chamber for measuring a tire air pressure inside of the tire pressure chamber; a wheel outlet valve between the wheel pressure chamber and the tire pressure chamber; a processor that reads a measure of the tire air pressure from the tire pressure sensor and controls the wheel outlet valve to allow air from the wheel pressure chamber to flow into the tire pressure chamber to increase the pressure in the tire pressure chamber when the tire air pressure is less than a reference tire pressure.

DETAILED DESCRIPTION OF THE INVENTION

A system and method for an automatic tire pressurizing wheel is disclosed. A system and method of wirelessly monitoring and controlling a pressurized air supply inside of a wheel pressure chamber located inside of a wheel and a tire pressure chamber inside of a tire mounted on the wheel is disclosed, wherein a processor controls a wheel outlet valve (also referred to as a "tire pressure inlet valve), wherein a wheel controller releases pressurized gas (wherein the gas is a gas (typically air or helium) or a liquid) from the wheel pressure chamber into the tire pressure chamber to provide an improved safety and durability of the tire mounted on the wheel. A wheel is disclosed that is designed to include a wheel pressure chamber to increase the strength of the wheel and contain stored high pressurized gas or liquid which can be air; an automatic air nozzle used to inflate the tire pressure chamber is connected to the wheel pressure chamber; and a monitoring wheel controller that rapidly monitors and controls a wheel outlet valve and a tire outlet valve air to monitor and control pressure inside of the tire pressure chamber to release air from the tire pressure chamber when the tire pressure chamber pressure is too high relative to a target tire pressure and to automatically inflate the tire pressure chamber with air from the wheel pressure chamber when the pressure inside of the tire pressure chamber is too low relative to a target tire pressure input to the wheel controller by a user at a user input device.

Tire pressure monitoring systems are known in the art. Such known systems include a plurality of sensor assemblies including but not limited to and temperature pressure sensors, each sensor assembly mounted to an associated vehicle wheel inside of the associated tire and powered by a long-life battery. The sensor assembly includes a pressure sensor and a temperature sensor that monitors the tire pressure and temperature, respectively. When the tire pressure is below a reference pressure, such as the tire manufacturer recommended PSI, a transmitter circuit of the sensor assembly transmits an RF signal to a vehicle-based receiver indicating a low-pressure condition. The vehicle-based receiver, upon receiving a low-pressure indication from a sensor assembly, activates an indicator within the passenger compartment to warn the driver. Tire pressure and temperature sensors also transmit pressure and temperature information periodically.

In a sensor system that includes four sensor assemblies for a vehicle, each sensor will have an associated identification code to distinguish itself from the other sensor assemblies of the vehicle. As part of transmission of a low tire pressure signal, each sensor assembly, upon detecting a low-pressure condition, transmits its identification code along with an indication of the low-pressure condition. Assuming the vehicle-based receiver is preprogrammed to associate a particular identification code with a particular tire location, the receiver can control a low-pressure indicator or display within the vehicle compartment to indicate the tire location having the low-pressure condition.

A lower-pressure tire has to rotate faster to travel the same distance as a higher-pressure tire.

A particular embodiment of the present invention provides automatic control of tire pressure which improves the safety of a wheel and tire under automatic pressure control of the invention. In an illustrative embodiment of the invention a system and method are disclosed that wirelessly monitor tire pressure and control the tire pressure too with a new wheel design to improve safety. In a particular illustrative embodiment, a hollow wheel is provided having a wheel pressure chamber designed to hold up to 200 pounds per square inch (PSI) in a particular embodiment, increasing strength of the wheel and enabling the storage of high pressure air in the wheel pressure chamber. An air nozzle which typically available at a service station to fill "tires" up to 50 PSI in one illustrative embodiment, is instead connected to the wheel pressure chamber to fill the wheel pressure chamber with pressurized gas (air, a gas or a liquid). The pressurized gas (air, gas or a liquid) is stored in the wheel pressure chamber designed to hold 200 PSI. A pressure monitoring circuit is provided to read a pressure inside of the tire pressure chamber, wherein the tire pressure chamber is located inside of a tire mounted on the wheel to rapidly control pressure inside of the tire pressure chamber. The wheel controller selectively activates an automatic tire outlet valve to release gas from the tire pressure chamber into the atmosphere when heat or other conditions cause a pressure inside of the tire pressure chamber to increase and exceed a tire pressure reference value. The wheel controller release high pressure gas from the wheel pressure into the tire pressure chamber to automatically increase pressure in the tire pressure chamber and inflate the tire when the air pressure in the tire pressure chamber is below a reference tire pressure value. By providing the wheel with a high-pressure wheel air chamber (high pressure indicating a pressure higher than a reference tire pressure), many air fills into the tire pressure chamber can take place before the wheel pressure chamber needs to be re-pressurized with gas. For racing cars, this would allow "dynamic" tire pressures to aid in performance related issues on various track configurations and heat conditions, drastically improving safety for race cars during competition.

Figure 1:
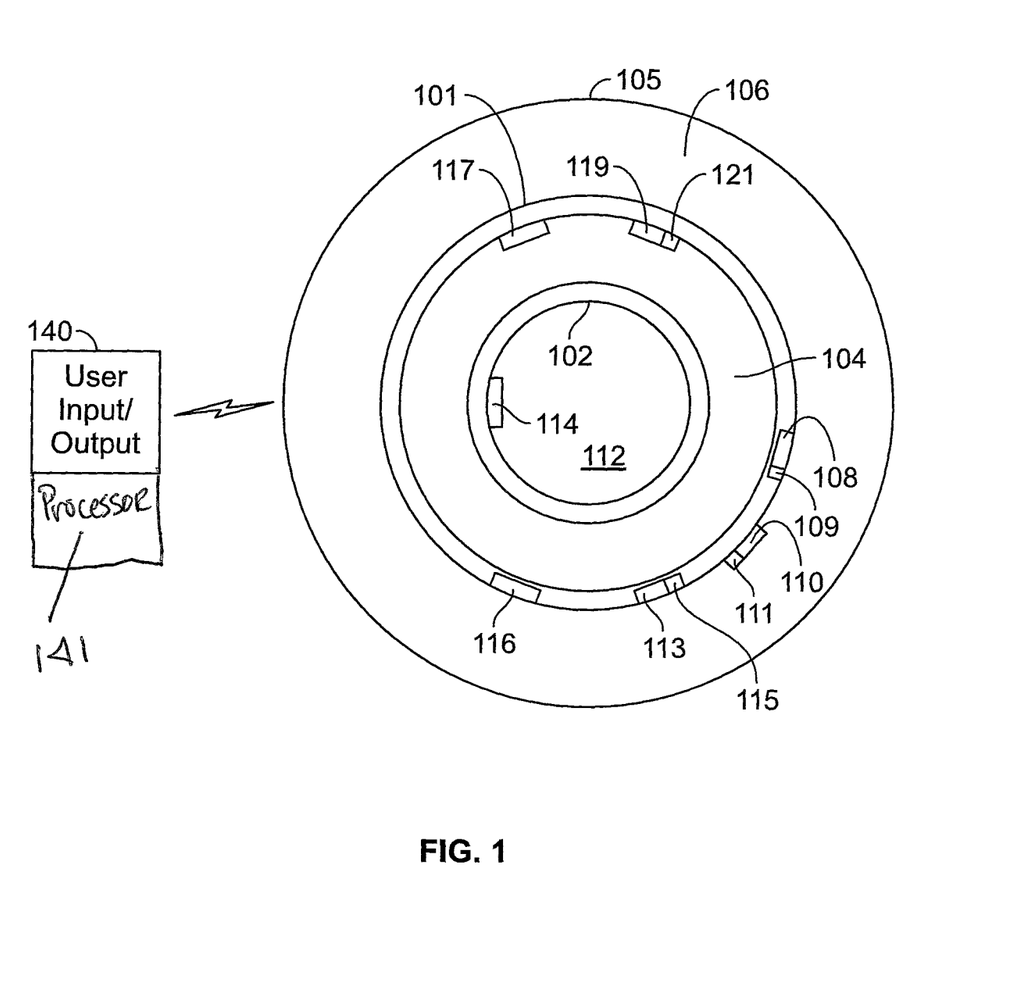
FIG. 1 is schematic plan view depiction of a system in accordance with a particular illustrative embodiment of the invention.

Turning now to FIG. 1, FIG. 1 is a schematic depiction of a particular illustrative embodiment of the invention, wherein a system is provided for automatically controlling tire pressure. As shown in FIG. 1, a motor vehicle having four identical wheels 101 configured as described herein, each wheel 101 being one of the four wheels on an vehicle, each having a tire 105 mounted thereon and a tire pressure chamber 106 inside of each one of the tires. The tire pressure chamber contains a gas, wherein in the gas can be in a liquid or a gaseous state, wherein the gas can be gas including but is not limited to air or helium. The wheel 101 includes but is not limited to a wheel pressure chamber 104 that contains and stores compressed gas for flowing from the wheel pressure chamber into tire pressure chamber and increasing the pressure inside of the tire pressure chamber. The wheel 101 includes but is not limited to a wheel pressure chamber 104 and a wheel outlet valve/automatic tire fill valve 108 coupled to the tire pressure chamber 106.

Figure 3:
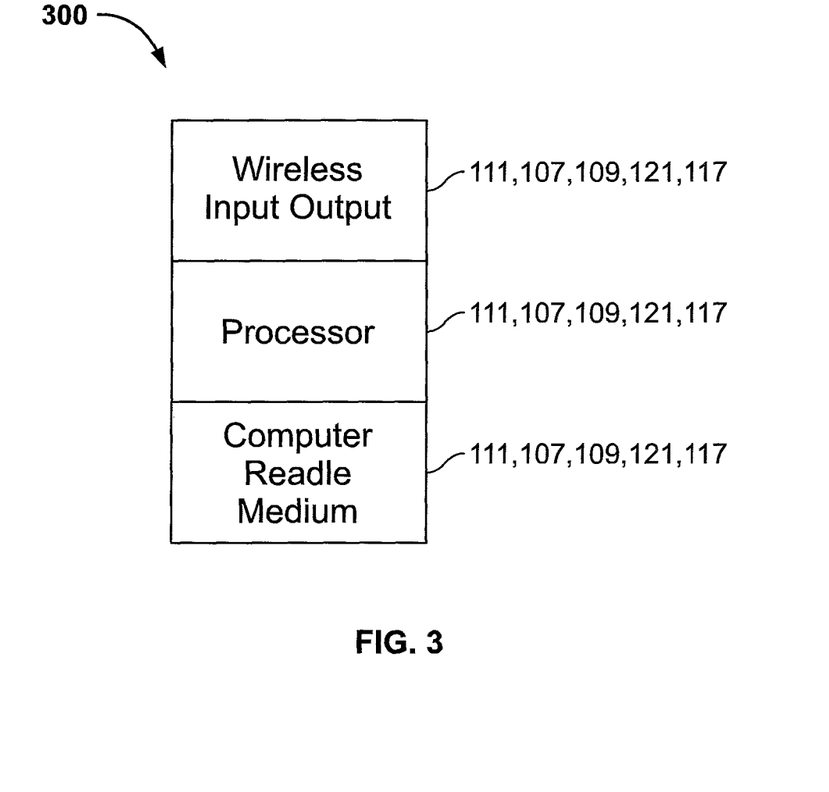
FIG. 3 is a schematic depiction of a processor attached to a computer readable medium and wireless input/output ports in an illustrative embodiment of the present invention.

A wheel outlet valve/automatic tire fill valve 108 is provided to allow high pressure gas inside of the wheel pressure chamber 104 to flow through the valve 108 into the tire pressure chamber 106 inside of the tire 105. In an illustrative embodiment of the invention the wheel pressure chamber contains 200 PSI of a gas and the tire pressure chamber 106 contains 50 PSI of a gas. A wheel outlet valve/automatic tire fill valve 108 is provided as an inlet valve to allow air from the high-pressure wheel pressure chamber 104 into the tire air pressure chamber increasing a pressure inside of the tire pressure chamber 106 under the control of the wheel controller 119. A processor 141 monitors a wheel controller 119 on each of the four vehicle tires. The processor 141 monitors and controls each of the four vehicle tires individually. A tire outlet valve 113 on the tire pressure chamber is provided as an outlet valve to automatically release gas from the tire pressure chamber 106 into the atmosphere and reduce air pressure inside of the tire pressure chamber 106 inside of tire 105 under control of a wheel processor 119. The wheel processor 119 (all processors herein include but are not limited to a computer readable medium and a wireless input output port) is attached to a wheel pressure sensor inside of the first wheel pressure chamber and a second pressure sensor 117 inside of the wheel pressure chamber. Each valve and pressure sensor 110, 105, 108, 119, 118 in an illustrative embodiment of the invention includes but is not limited to a processor, computer readable medium and wireless input and output 111, 107, 109, 121 and 117 as shown in FIG. 3.

A user input and output keyboard 140 and processor 141 having wireless input and output is used to digitally communicate with the wheel controller in each vehicle tire to provide inputs and dynamically sets, controls and monitors values for tire pressure and wheel pressure in real time. The user input and processor are remotely located from the wheel in a scenario such as a race track control station to control reference pressure values and associated tire pressure values during a race based on speed, temperature and bank inclination in turn.

In a particular embodiment, the processor contains a computer program comprising artificial intelligence that monitors race track inclination, race track position relative to turns and straight-away on a race track, wheel speed, vehicle speed, track temperature and air pressure to develop a historical data base of information including but not limited to race track inclination, race track position relative to turns and straight-away on a race track, wheel speed, vehicle speed, track temperature and air pressure. The artificial intelligence uses the historical data to train an neural network that monitors and control the air pressure in a race car during a race based on the race track inclination, race track position relative to turns and straight-away on a race track, wheel speed, vehicle speed, track temperature and air pressure.

In a particular illustrative embodiment of the invention, a user manually pumps air into the wheel pressure chamber in the wheel to 200 PSI through wheel air inlet valve 114 and manually pumps air into the pressure chamber in the tire to 50 PSI through tire inlet valve 116. In another embodiment, the air pressure inside of tire pressure chamber 106 in the tire 105 is monitored by the wheel controller 119 and processor 120 by reading a pressure measurement from tire pressure sensor 110 and is regulated by wheel pressure controller 119. In another embodiment, the wheel processor receives commands from the user input and output keyboard 140 and processor 120. The input and output keyboard 140 and controller 141 accepts a user command to set a reference tire pressure value which is used to by the wheel controller 119 and processor 120 to automatically adjust the pressure inside of the tire pressure chamber to the reference tire pressure value. The tire pressure is monitored and a computer program stored in the computer readable medium attached to the wheel processor 119 and processor 120 controls the valves as described herein, to increase or decrease the tire pressure to maintain the tire pressure at the reference tire pressure value. In a particular illustrative embodiment of the invention, wireless data input and output is provided between all of the controllers, valves, input/output keyboard 140 and pressure sensors wherein data input and out (or data communication) is accomplished by wireless data communication.

Figure 2:
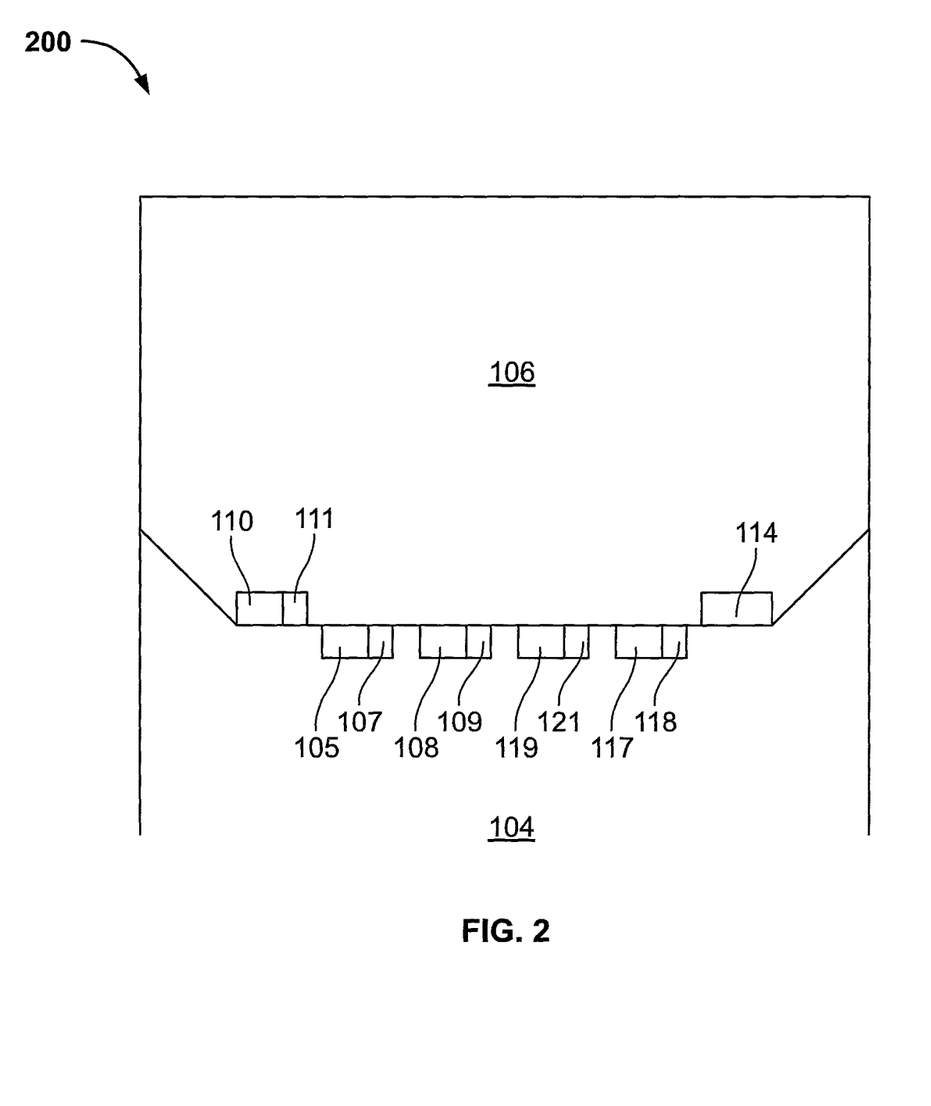
FIG. 2 is schematic cross section view of the plan view depiction of FIG. 1 showing a system in accordance with a particular illustrative embodiment of the invention.

Turning now to FIG. 2, FIG. 2 depicts a schematic plan view representation of a cross section view of the system shown in FIG. 1.

Turning now to FIG. 3, FIG. 3 is a schematic plan view depiction of all processors and controllers 111, 107, 109, 120, 121 and 117 which include but are not limited to a processor 200, computer readable medium 203 and wireless input and output ports 201.

Figure 4:
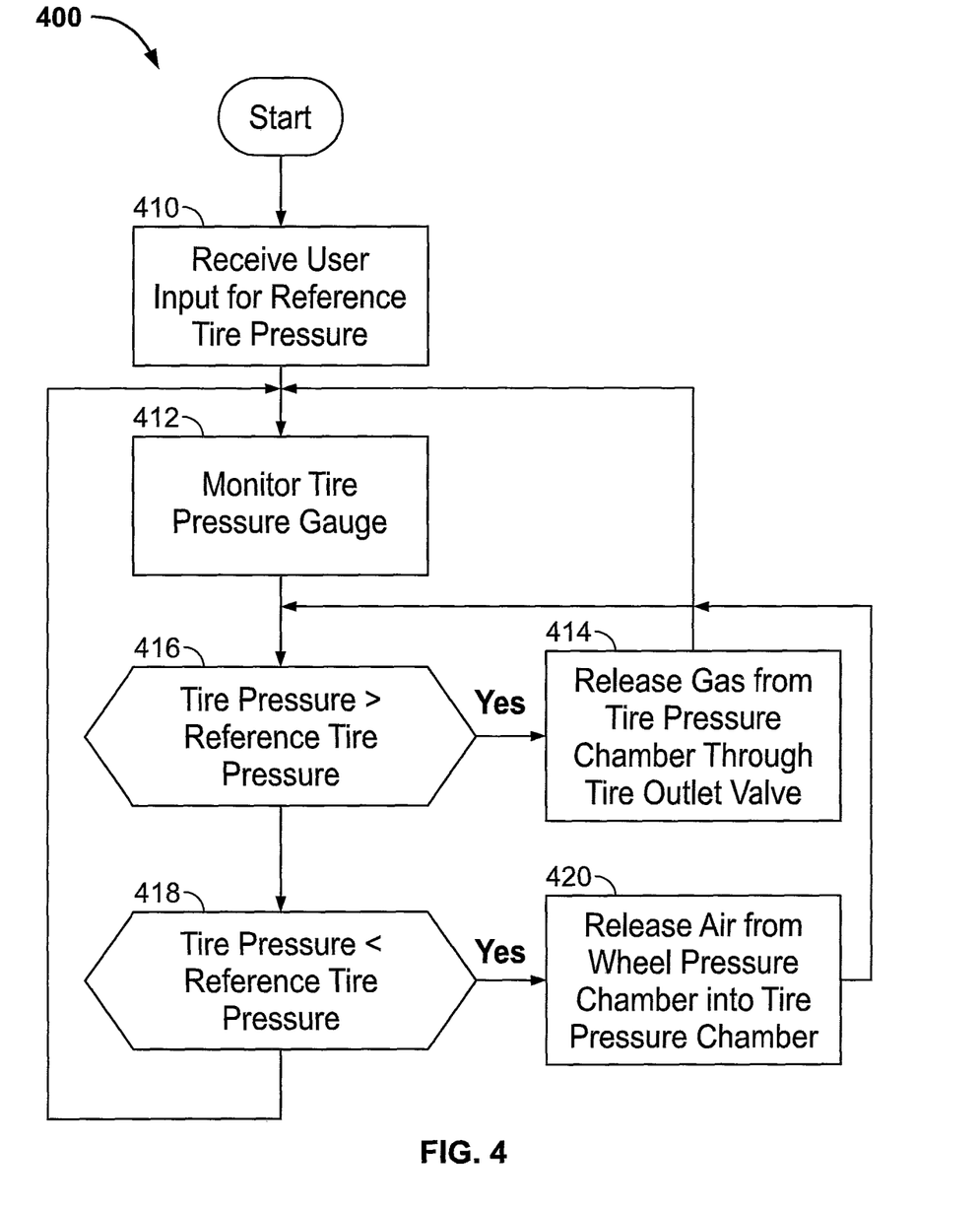
FIG. 4 depicts a flow chart of operations performed in a particular illustrative embodiment of the invention.

Turning now to FIG. 4, FIG. 4 depicts a plan view flow of operations 400 for a wheel controller in a particular illustrative embodiment of the invention. As shown in FIG. 4, at 400 a wheel controller computer program receives user input from the user input/output device 140 and main controller 141. At 412 the wheel controller computer program monitors tire pressure inside of the tire pressure chamber as measured by tire pressure sensor 110. At 416, wheel controller computer program determines if the tire pressure is greater than the reference tire pressure. If the tire pressure is greater than the reference tire pressure, then the computer program proceeds to 414 and releases gas from the tire pressure chamber through the tire outlet valve and the computer program returns to 412.

If the tire pressure is not greater than the reference tire pressure, then the computer program proceeds to 418 and determines if the tire pressure is less than the reference tire pressure. If the tire pressure is less than the reference tire pressure, then the computer program proceeds to 420 and releases gas from the wheel pressure chamber into the tire pressure chamber through the wheel outlet valve/tire inlet valve and the computer program returns to 412. If the tire pressure is not less than the reference tire pressure at 418 the computer program returns to 412. Reference tire pressures include but are not limited to manufacturers suggested PSI ratings and historical tire pressures gathered the monitoring artificial intelligence that monitors tire pressure during a race along with temperature, speed, track location and inclination of track on which the vehicle is racing for each of four tires on the vehicle during a race.

Figure 5:
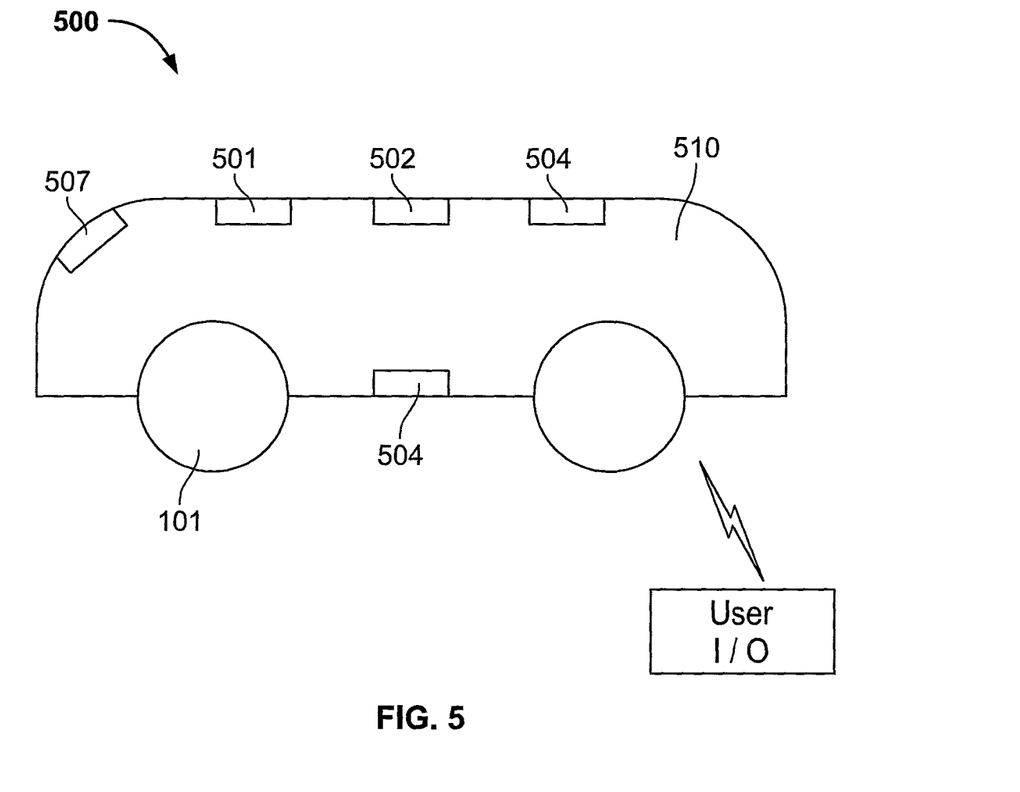
FIG. 5 is schematic plan view depiction of a system in accordance with a particular illustrative embodiment of the invention installed on a race car.

Turning now to FIG. 5, in another particular embodiment of the present invention, the system automatic tire pressuring system 100 is mounted on four wheels of a race care 510 along with an inclinometer 501, a position locator for a global positioning system 502, a fuel sensor to determine fuel tank weight based on the amount of fuel in the fuel tank based on monitoring the fuel tank sensor in the race car, radius of curvature for a curve in the oval race track for the current position on an oval race track along with track banking inclination on the curves and race track temperature and tire temperature. Tires heat up as the race progresses and the effects of ambient outdoor temperature, race track temperature and race car speed. The wheel controller records the historical values the inclination for each position on the race track and stores these inclination values for each position on the race track.

Figure 6:
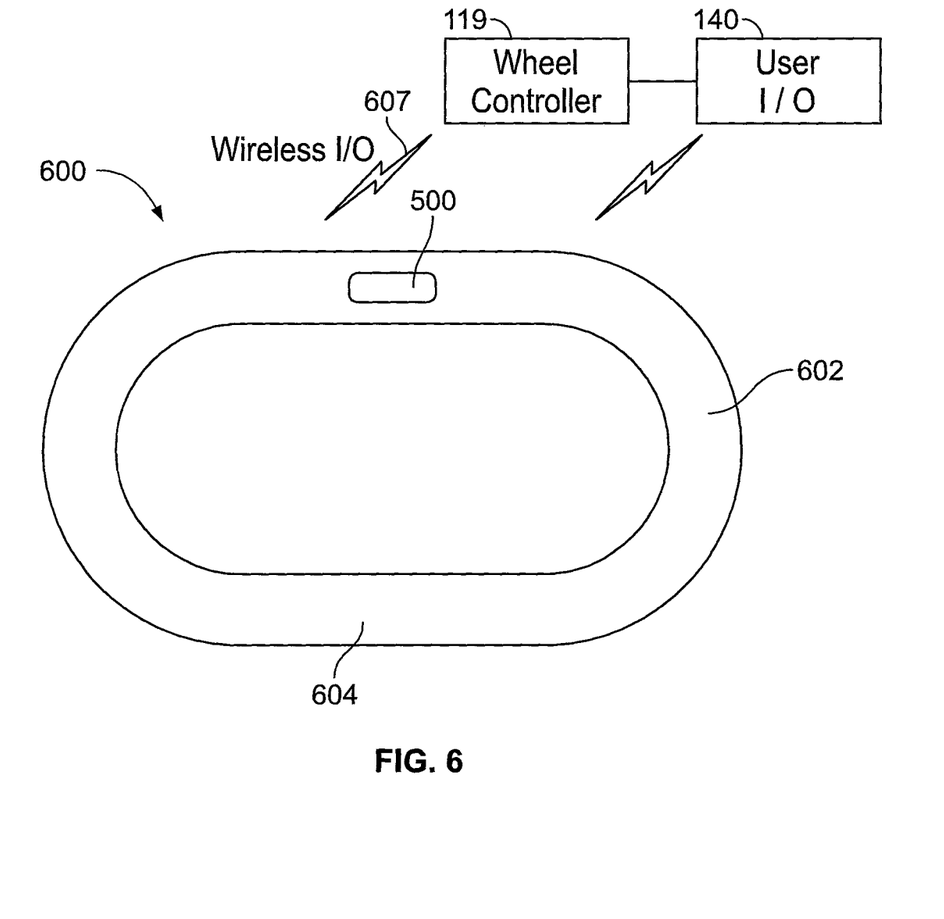
FIG. 6 is schematic plan view depiction of a system in accordance with a particular illustrative embodiment of the invention installed on a race car for controlling tire pressure during a race.

As shown in FIG. 6, typically a race track includes but is not limited to a racetrack straight away sections 604 are flat and the race track turns 602 are banked to keep the race car on the track at high speeds during a turn on the race track turns. The wheel controller computer program tracks the race car position on the race track adjusts the tire pressure automatically to optimum values for a current inclination for the current race car position and inclination on the race track, fuel tank weight, race car speed (determined by the GPS versus time), radius of curvature for a curve at the current position the race track and race track temperature. In another particular illustrative embodiment, optimum values for tire pressure the current race car position and inclination on the race track, fuel tank weight, race car speed (determined by the GPS positing versus time) and race track temperature are calculated and stored in the wheel controller computer readable medium. The computer program stored in the computer readable medium uses the estimated optimum tire pressure values for the current race car position and inclination on the race track, fuel tank weight, race car speed (determined by the GPS versus time) and tire and race track temperature to automatically control tire pressure during a car race.

In another particular embodiment a race track is the present invention is used on a non-oval race track such as a Lemans TRADEMARK race track circuit, where turns are irregularly placed and usually not banked, as the Lemans TRADEKMARK race track circuit is usually made up of residential streets that have been closed temporarily to form the Lemans TRADEMARK race track circuit.

In another particular illustrative embodiment, optimum values for tire pressure for the current race car position and inclination on the race track, fuel tank weight, race car speed (determined by the GPS versus time) and race track temperature are monitored and learned by a neural network in the wheel controller computer program and stored in the wheel controller computer readable medium. The neural network, once trained with the optimum tire pressure values for the current race car position and inclination on the race track, fuel tank weight, race car speed and race track temperature are then used to automatically control tire pressure during a car race. Since a lower pressure inflated tire has a smaller diameter than a higher pressure inflated tire, the system and method of the present invention lower's tire pressure in curve to dynamically control tire pressure to dynamically lower the pressure on a sharp curve to slow the race car in a curve and act as a braking mechanism, based on the historical values stored in the historical data base formed by artificial intelligence monitoring of the vehicles tire pressure, speed of rotation and track inclination. In a particular embodiment, the tire pressure inside of the two tires on the side of the car nearest the outside of the track are lower to provide braking on these tires during a high-speed turn during a race.

In another particular embodiment of the invention, wireless data transmission and/or control commands are accomplished using an RFID technology (RFID—Radio Frequency Identification). In another particular embodiment wireless data transmission and/or control commands are accomplished using or NFC technology (Near-Field Communication NFC).

A particular illustrative embodiment of a system is disclosed including but not limited to a wheel having a wheel pressure chamber; a tire having a tire pressure chamber, wherein the tire is mounted on the wheel; a tire pressure sensor inside of the tire pressure chamber for measuring a tire air pressure inside of the tire pressure chamber; a wheel outlet valve between the wheel pressure chamber and the tire pressure chamber; a processor that reads a measure of the tire air pressure from the tire pressure sensor and controls the wheel outlet valve to allow air from the wheel pressure chamber to flow into the tire pressure chamber to increase the pressure in the tire pressure chamber when the tire air pressure is less than a reference tire pressure. In another illustrative embodiment of the system the system further includes but is not limited to a tire outlet valve, wherein the processor reads a measure of the tire air pressure from the tire pressure sensor and controls the wheel outlet valve to allow air from the tire pressure chamber to flow out of the tire pressure chamber to decrease the pressure in the tire pressure chamber when the tire air pressure is greater than a reference tire pressure. In another illustrative embodiment of the system the system further includes but is not limited to a vehicle on which the system is mounted; an inclinometer mounted on the vehicle; a racetrack on which the vehicle travels, wherein wheel controller adjusts the tire pressure based on an inclination value for a current position of the vehicle on the race track. In another illustrative embodiment of the system the system further includes but is not limited to a vehicle on which the system is mounted; a track temperature sensor mounted on the vehicle; a racetrack on which the vehicle travels, wherein wheel controller adjusts the tire pressure based on a race track temperature value for a current position of the vehicle on the race track. In another illustrative embodiment of the system the system further includes but is not limited to a vehicle on which the system is mounted; a fuel tank weight sensor mounted on the vehicle; a racetrack on which the vehicle travels, wherein wheel controller adjusts the tire pressure based on a fuel tank weight value from the fuel tank weight sensor for a current position of the vehicle on the race track. In another illustrative embodiment of the system the system further includes but is not limited to a vehicle on which the system is mounted; a global positioning system mounted on the vehicle; a racetrack on which the vehicle travels, wherein wheel controller adjusts the tire pressure based on a current position value for a current position of the vehicle on the race track.

In another illustrative embodiment of the invention, a method is disclosed that includes but is not limited to reading on a wheel processor, a tire pressure value from a tire pressure sensor inside of a tire pressure chamber, wherein a wheel having a wheel pressure chamber has mounted thereon a tire containing the tire pressure chamber, wherein the tire is mounted on the wheel; controlling on the wheel processor a wheel outlet valve between the wheel pressure chamber and the tire pressure chamber to allow air in the wheel to flow into the tire when the tire pressure is below a reference tire pressure; reading on the wheel processor a measure of the tire air pressure from the tire pressure sensor; and controlling on the wheel processor the wheel outlet valve to allow air from the wheel pressure chamber to flow into the tire pressure chamber to increase the pressure in the tire pressure chamber when the tire air pressure is less than the reference tire pressure. In another illustrative embodiment of the method, the method further includes but is not limited to controlling on the wheel processor a tire pressure outlet valve, wherein the processor reads a measure of the tire air pressure from the tire pressure sensor and controls the wheel outlet valve to allow air from the tire pressure chamber to flow out of the tire pressure chamber to decrease the pressure in the tire pressure chamber when the tire air pressure is greater than a reference tire pressure. In another illustrative embodiment of the method, the method further includes but is not limited to measuring on the wheel processor an inclinometer value for a current position of the vehicle on a race track; and adjusting on the wheel processor the tire pressure based on an inclination value for a current position of the vehicle on the race track. In another illustrative embodiment of the method, the method further includes but is not limited to measuring a race track temperature value for a race track for a current position of the vehicle on a race track; adjusting automatically from the wheel controller the tire pressure based on the race track temperature value for a current position of the vehicle on the race track; a track temperature sensor mounted on the vehicle; adjusting at wheel controller the tire pressure based on a race track temperature value for a current position of the vehicle on the race track. In another illustrative embodiment of the method, the method further includes but is not limited to measuring on the wheel processor a fuel tank weight sensor mounted on the vehicle; and adjusting on the wheel processor the tire pressure based on a fuel tank weight value from the fuel tank weight sensor for a current position of the vehicle on the race track. In another illustrative embodiment of the method, the method further includes but is not limited to measuring on the wheel processor a current fuel tank weight value for a current position of the vehicle on a race track; and adjusting the tire pressure value based on fuel tank weight value for a current position of the vehicle. In another illustrative embodiment of the method, the method further includes but is not limited to measuring on the wheel processor an inclinometer value for a current position of the vehicle on a race track; measuring on the wheel processor a racetrack temperature value for a racetrack on which the vehicle travels; measuring a fuel tank weight value for the vehicle; and adjusting on the wheel processor the tire pressure based on an inclination value for a current position of the vehicle on the race track dynamically during a race.

In another illustrative embodiment a system is disclosed, the system includes but is not limited to a wheel controller comprising a processor in data communication with a computer readable medium for inputting and outputting data between the processor and the computer readable medium; a computer program comprising instructions that are executed by the processor the computer program comprising instructions to control a wheel outlet valve between the wheel pressure chamber and the tire pressure chamber to allow air in the wheel to flow into the tire when the tire pressure is below a reference tire pressure; instructions to read a measure of the tire air pressure from the tire pressure sensor; and instructions to control the wheel outlet valve to allow air from the wheel pressure chamber to flow into the tire pressure chamber to increase the pressure in the tire pressure chamber when the tire air pressure is less than the reference tire pressure.

In another illustrative embodiment of the system, the computer program further includes but is not limited to instructions to control a tire pressure outlet valve, wherein the processor reads a measure of the tire air pressure from the tire pressure sensor and controls the wheel outlet valve to allow air from the tire pressure chamber to flow out of the tire pressure chamber to decrease the pressure In another illustrative embodiment of the system, the computer program further includes but is not limited to instructions to measure an inclinometer value for a current position of the vehicle on a race track; a racetrack on which the vehicle travels, wherein wheel controller adjusts the tire pressure based on an inclination value for a current position of the vehicle on the race track. In another illustrative embodiment of the system, the computer program further includes but is not limited to instructions to measure a race track temperature value for a race track for a current position of the vehicle on a race track; instructions to adjust automatically from the wheel controller the tire pressure based on the race track temperature value for a current position of the vehicle on the race track, a race track temperature sensor mounted on the vehicle; instructions to adjust at wheel controller the tire pressure based on a race track temperature value for a current position of the vehicle on the race track.

In another illustrative embodiment of the system, the computer program further includes but is not limited to instructions to measure a fuel tank weight sensor mounted on the vehicle; and instructions to adjust the tire pressure based on a fuel tank weight value from the fuel tank weight sensor for a current position of the vehicle on the race track. In another illustrative embodiment of the system, the computer program further includes but is not limited to instructions to measure a current fuel tank weight value for a current position of the vehicle on a race track; and instructions to adjust the tire pressure value based on fuel tank weight value for a current position of the vehicle. In another illustrative embodiment of the system, the computer program further includes but is not limited to instructions to measure an inclinometer value for a current position of the vehicle on a race track; instructions to measure a racetrack temperature value for a racetrack on which the vehicle travels; instructions to measure a fuel tank weight value for the vehicle; and instructions to adjust the tire pressure dynamically during a race, based on the race track temperature, inclination value for the current position of the vehicle on the fuel tank weight.

The figures herein include block diagram and flowchart illustrations of methods, apparatus(s) and computer program products according to various embodiments of the present inventions. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus may be used to implement the functions specified in the block, blocks or flow charts. These computer program instructions may also be stored in a computer-readable medium or memory that can direct a computer or other programmable data processing apparatus to function in a particular manner, such that the instructions stored in the computer-readable medium or memory produce an article of manufacture including instructions which may implement the function specified in the block, blocks or flow charts. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block, blocks or flow charts.

Those skilled in the art should readily appreciate that programs defining the functions of the present inventions can be delivered to a computer in many forms, including but not limited to: (a) information permanently stored on non-writable storage media (e.g., read only memory devices within a computer such as ROM or CD-ROM disks readable by a computer I/O attachment); (b) information alterably stored on writable storage media (e.g., floppy disks and hard drives); or (c) information conveyed to a computer through communication media for example using wireless, baseband signaling or broadband signaling techniques, including carrier wave signaling techniques, such as over computer or telephone networks via a modem, or via any of networks.

The term "executable" as used herein means that a program file is of the type that may be run by the Wheel Controller 119. In specific embodiments, examples of executable programs may include without limitation: a compiled program that can be translated into machine code in a format that can be loaded into a random access portion of the Computer Readable Medium 128 and run by the Wheel Controller 119; source code that may be expressed in proper format such as object code that is capable of being loaded into a random access portion of the Computer Readable Medium and executed by the Wheel Controller 119; or source code that may be interpreted by another executable program to generate instructions in a random access portion of the Computer Readable Medium to be executed by the Wheel Controller 119. An executable program may be stored in any portion or component of the Computer Readable Medium including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The Computer Readable Medium may include both volatile and nonvolatile memory and data storage components. Volatile components are those that do not retain data values upon loss of power. Nonvolatile components are those that retain data upon a loss of power. Thus, the Computer Readable Medium may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In a specific embodiment, the Load Sharing Processor may represent multiple Load Sharing Processors and/or multiple processor cores and the Computer Readable Medium may represent multiple Computer Readable Mediums that operate in parallel processing circuits, respectively. In such a case, the local interface may be an appropriate network that facilitates communication between any two of the multiple Processors, between any processor and any of the Computer Readable Medium, or between any two of the Computer Readable Mediums, etc. The local interface may comprise additional systems designed to coordinate this communication, including, for example, performing load balancing. The Load Sharing Processor may be of electrical or of some other available construction.

Although the programs and other various systems, components and functionalities described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

Flowcharts and Block Diagrams of the Figures herein show the functionality and operation of various specific embodiments of certain aspects of the present inventions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a Load Sharing Processor in a computer system or other system. The machine code may be converted from the source code, etc. If embodied in hardware, each block may represent a circuit or a number of interconnected circuits to implement the specified logical function(s).

Although the flowchart and block diagram of FIG. 1 show a specific order of execution, it is understood that the order of execution may differ from that which is depicted. For example, the order of execution of two or more blocks may be scrambled relative to the order shown. Also, two or more blocks shown in succession in FIG. 1 may be executed concurrently or with partial concurrence. Further, in some embodiments, one or more of the blocks shown in FIG. 1 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present inventions.

Any logic or application described herein that comprises software or code can be embodied in any non-transitory computer-readable medium, such as computer-readable medium, for use by or in connection with an instruction execution system such as, for example, a Load Sharing Processor in a computer system or other system. In this sense, the logic may comprise, for example, statements including instructions and declarations that can be fetched from the computer-readable medium and executed by the instruction execution system. In the context of the present inventions, a "computer-readable medium" may include any medium that may contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random-access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The Load Sharing Processor may further include a network interface coupled to the bus and in communication with the network. The network interface may be configured to allow data to be exchanged between computer and other devices attached to the network or any other network or between nodes of any computer system or the video system. In addition to the above description of the network, it may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 159 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

What is claimed is:

1. A system comprising:
   a vehicle comprising:
      a global positioning system;
      a plurality of wheels each having a wheel pressure chamber;
      a plurality of tires each having a tire pressure chamber, wherein the tire is mounted on the wheel;
      a tire pressure sensor inside of the tire pressure chamber for measuring a tire air pressure inside of the tire pressure chamber;
      a wheel outlet valve between the wheel pressure chamber and the tire pressure chamber;
      a processor that reads a measure of the tire air pressure from the tire pressure sensor and controls the wheel outlet valve to allow air from the wheel pressure chamber to flow into the tire pressure chamber to increase the pressure in the tire pressure chamber when the tire air pressure is less than a reference tire pressure; and
      a computer readable medium containing a computer program comprising instructions executed by the processor,
      wherein as the vehicle travels on a race track, the processor adjusts the tire pressure based on a current position value for a current position of the vehicle on the race track, wherein the processor executes the computer program and monitors tire air pressure, temperature, inclination and speed of the vehicle to establish reference values for tire air pressure and dynamically controls the tire air pressure during a race, the computer program further comprising instructions for determining a curve in the race track and instructions to dynamically lower the tire air pressure on the curve to act as a braking mechanism to slow the vehicle in the curve, based on historical values stored in a historical data base formed by monitoring the tire air pressure, speed of rotation and track inclination, wherein the tire air pressure of at least one tire on a side of the vehicle nearest the outside of the track is lowered to provide braking during a high-speed turn.

2. The system of claim 1, further comprising: a tire outlet valve, wherein the processor reads a measure of the tire air pressure from the tire pressure sensor and controls the wheel outlet valve to allow air from the tire pressure chamber to flow out of the tire pressure chamber to decrease the tire air pressure in the tire pressure chamber when the tire air pressure is greater than a reference tire air pressure.

3. The system of claim 1, further comprising: the vehicle having four wheels on which are mounted four tires; and an inclinometer mounted on the vehicle, wherein the processor adjusts the tire air pressure based on an inclination value for a current position of the vehicle on the race track.

4. The system of claim 1, further comprising a track temperature sensor mounted on the vehicle, wherein the processor adjusts the tire air pressure based on a race track temperature value for a current position of the vehicle on the race track.

5. The system of claim 1, further comprising a fuel tank level sensor mounted on the vehicle to determine fuel weight, wherein the processor adjusts the tire air pressure in the plurality of tires based on a fuel tank weight value from the fuel tank weight sensor for a current position of the vehicle on the race track, wherein the system is provided on each of four wheels.

6. The system of claim 1, wherein the processor monitors tire air pressure, temperature, inclination and speed for the vehicle to establish reference values for tire air pressure, wherein the processor dynamically controls the tire air pressure in the plurality of tires during a race.

7. A method comprising:
reading on a processor a tire air pressure value from a tire air pressure sensor inside of a tire pressure chamber, wherein a wheel having a wheel pressure chamber has mounted thereon a tire containing the tire pressure chamber;
controlling on the processor a wheel outlet valve between the wheel pressure chamber and the tire pressure chamber to allow air in the wheel pressure chamber to flow into the tire pressure chamber when the tire air pressure is below a reference tire air pressure;
reading on the processor a measure of the tire air pressure from the tire air pressure sensor;
controlling on the processor the wheel outlet valve to allow air from the wheel pressure chamber to flow into the tire pressure chamber to increase the tire air pressure in the tire pressure chamber when the tire air pressure is less than the reference tire air pressure;
dynamically controlling the tire air pressure in a vehicle having four wheels on a race track;
determining a curve in the race track;
dynamically lowering the tire air pressure on the curve to slow the vehicle in a curve and act as a braking mechanism, based on historical values stored in a historical data base monitoring of the tire air pressure, speed of wheel rotation and track inclination, wherein the tire air pressure inside of two tires on a side of the vehicle nearest the outside of the track is lowered to provide braking during a high-speed turn.

8. The method of claim 7, further comprising: controlling on the processor a tire pressure outlet valve, wherein the processor reads a measure of the tire air pressure from the tire air pressure sensor and controls the wheel outlet valve to allow air from the tire pressure chamber to flow out of the tire pressure chamber to decrease the tire air pressure in the tire pressure chamber when the tire air pressure is greater than a reference tire air pressure.

9. The method of claim 7, further comprising:
measuring by the wheel processor an inclinometer value for a current position of the vehicle on the race track; and
adjusting by the wheel processor the tire air pressure based on an inclination value for a current position of the vehicle on the race track.

10. The method of claim 7, further comprising:
the processor receiving, from a track temperature sensor mounted on the vehicle, a race track temperature value for a current position of the vehicle on the race track; and
adjusting by the processor automatically the tire air pressure based on the race track temperature value for the current position of the vehicle on the race track.

11. The method of claim 7, further comprising:
measuring by the processor a fuel tank weight sensor mounted on the vehicle; and
adjusting by the processor the tire air pressure based on a fuel tank weight value from the fuel tank weight sensor for a current position of the vehicle on the race track.

12. The method of claim 7, further comprising:
measuring by the processor a current fuel tank weight value for a current position of the vehicle on the race track; and
adjusting by the processor the tire air pressure value based on the fuel tank weight value for the current position of the vehicle.

13. The method of claim 7, further comprising:
measuring by the processor an inclinometer value for a current position of the vehicle on the race track;
measuring by the processor a race track temperature value for the race track on which the vehicle travels;
measuring by the processor a fuel tank weight value for the vehicle; and
adjusting by the processor the tire air pressure based on the inclinometer value for the current position of the vehicle on the race track dynamically.

14. A system comprising:
a wheel controller comprising a processor in data communication with a computer readable medium for inputting and outputting data between the processor and the computer readable medium;
a computer program comprising instructions that are executed by the processor the computer program comprising:
instructions to read a measure of tire air pressure from a tire pressure sensor;
instructions to control a wheel outlet valve between a wheel pressure chamber and a tire pressure chamber to allow air in the wheel pressure chamber to flow into the tire pressure chamber to increase the tire air pressure in the tire pressure chamber when the tire air pressure is below a reference tire air pressure; and
instructions to determine a curve in a race track and instructions to dynamically lower the tire air pressure on the curve to slow a race car in the curve and act as a braking mechanism, based on historical values stored in a historical data base formed by monitoring tire air pressure, speed of wheel rotation and track inclination, wherein the tire air pressure inside of two tires on a side of the race car nearest the outside of the track is lowered to provide braking during a high-speed turn during a race.

15. The system of claim 14, the computer program further comprising:
instructions to control a tire pressure outlet valve, wherein the processor reads a measure of the tire air pressure from the tire pressure sensor and controls the wheel outlet valve to allow air from the tire pressure chamber to flow out of the tire pressure chamber to decrease the tire air pressure in the tire pressure chamber when the tire air pressure is greater than a reference tire air pressure.

16. The system of claim 14, the computer program further comprising:
instructions to measure an inclinometer value for a current position of the race car on the race track, wherein the wheel controller adjusts the tire air pressure based on the inclinometer value for the current position of the race car on the race track.

17. The system of claim 14, the computer program further comprising:
instructions to measure a race track temperature value for a current position of the race car on the race track from a track temperature sensor mounted on the race car;

instructions to adjust automatically from the wheel controller the tire air pressure based on the race track temperature value for a current position of the race car on the race track.

18. The system of claim 14, the computer program further comprising:
instructions to measure a fuel tank weight sensor mounted on the race car; and
instructions to adjust the tire air pressure based on a fuel tank weight value from the fuel tank weight sensor for a current position of the race car on the race track.

19. The system of claim 14, the computer program further comprising:
instructions to measure a current fuel tank weight value for a current position of the race car on the race track; and
instructions to adjust the tire air pressure value based on the fuel tank weight value for the current position of the race car.

20. The system of claim 14, the computer program further comprising:
instructions to measure an inclinometer value for a current position of the race car on the race track;
instructions to measure a race track temperature value for the race track on which the race car travels;
instructions to measure a fuel tank weight value for the race car; and
instructions to adjust the tire air pressure dynamically during a race, based on the race track temperature, inclinometer value for the current position of the race car, and the fuel tank weight.

\* \* \* \* \*